(12) United States Patent
Goodman et al.

(10) Patent No.: US 12,468,801 B2
(45) Date of Patent: Nov. 11, 2025

(54) USE OF IMAGE SIGNING IN ENDPOINT DEVICE OPERATION MANAGEMENT

(71) Applicant: Dell Products L.P., Round Rock, TX (US)

(72) Inventors: Bradley K. Goodman, Nashua, NH (US); Joseph Caisse, Burlington, MA (US); James Daniel Harms, Worthington, OH (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 18/341,971

(22) Filed: Jun. 27, 2023

(65) Prior Publication Data

US 2025/0005133 A1 Jan. 2, 2025

(51) Int. Cl.
*G06F 21/00* (2013.01)
*G06F 21/51* (2013.01)

(52) U.S. Cl.
CPC ........ G06F 21/51 (2013.01); *G06F 2221/033* (2013.01)

(58) Field of Classification Search
CPC ... G06F 21/51; G06F 2221/033; G06F 21/575
See application file for complete search history.

(56) References Cited

U.S. PATENT DOCUMENTS

| | | | |
|---|---|---|---|
| 11,665,001 B1* | 5/2023 | Engelkemier | G06F 21/575 713/2 |
| 2020/0201779 A1* | 6/2020 | Skertic | H04L 63/0823 |
| 2021/0319109 A1* | 10/2021 | Weng | G06F 9/4401 |
| 2022/0083640 A1* | 3/2022 | Duval | G06F 21/64 |
| 2022/0398104 A1* | 12/2022 | Edwards | G06F 9/4408 |
| 2024/0193246 A1* | 6/2024 | Bansal | G06F 21/36 |

\* cited by examiner

*Primary Examiner* — Ghazal B Shehni
(74) *Attorney, Agent, or Firm* — WOMBLE BOND DICKINSON (US) LLP

(57) ABSTRACT

Methods and systems for securing endpoint devices are disclosed. Overtime, the functionality of endpoint devices may be modified as new software is developed. To secure endpoint devices, software images of the new software may be verified prior to execution. Information usable to verify the software images may be stored in a database. A set of rules may be used to verify the trustworthiness of the software images based on the content of the database. Another set of rules may be used to verify the content of the database.

20 Claims, 8 Drawing Sheets

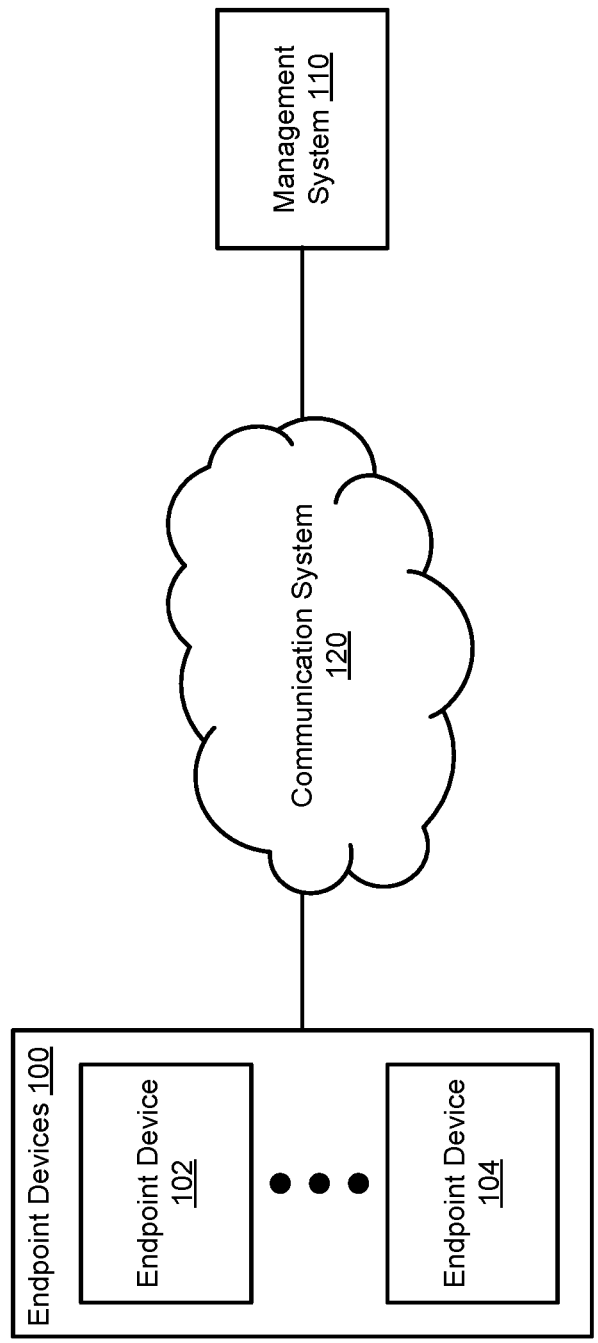

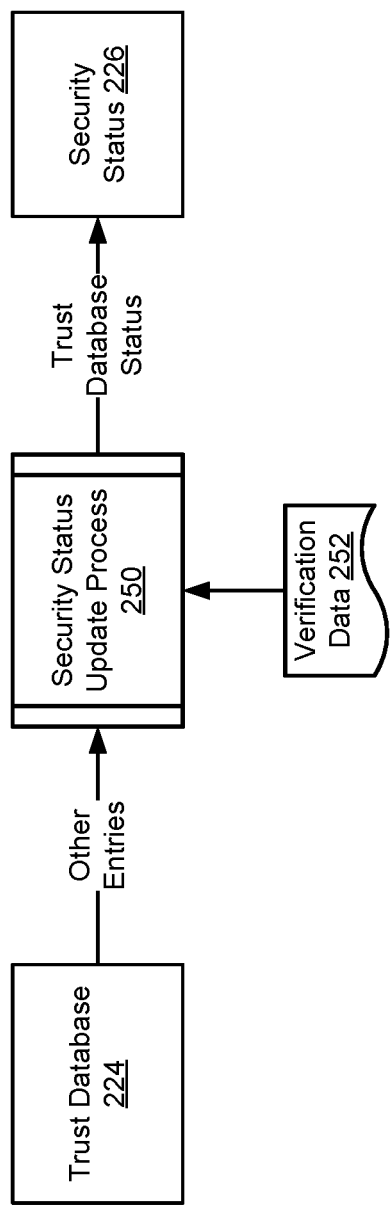

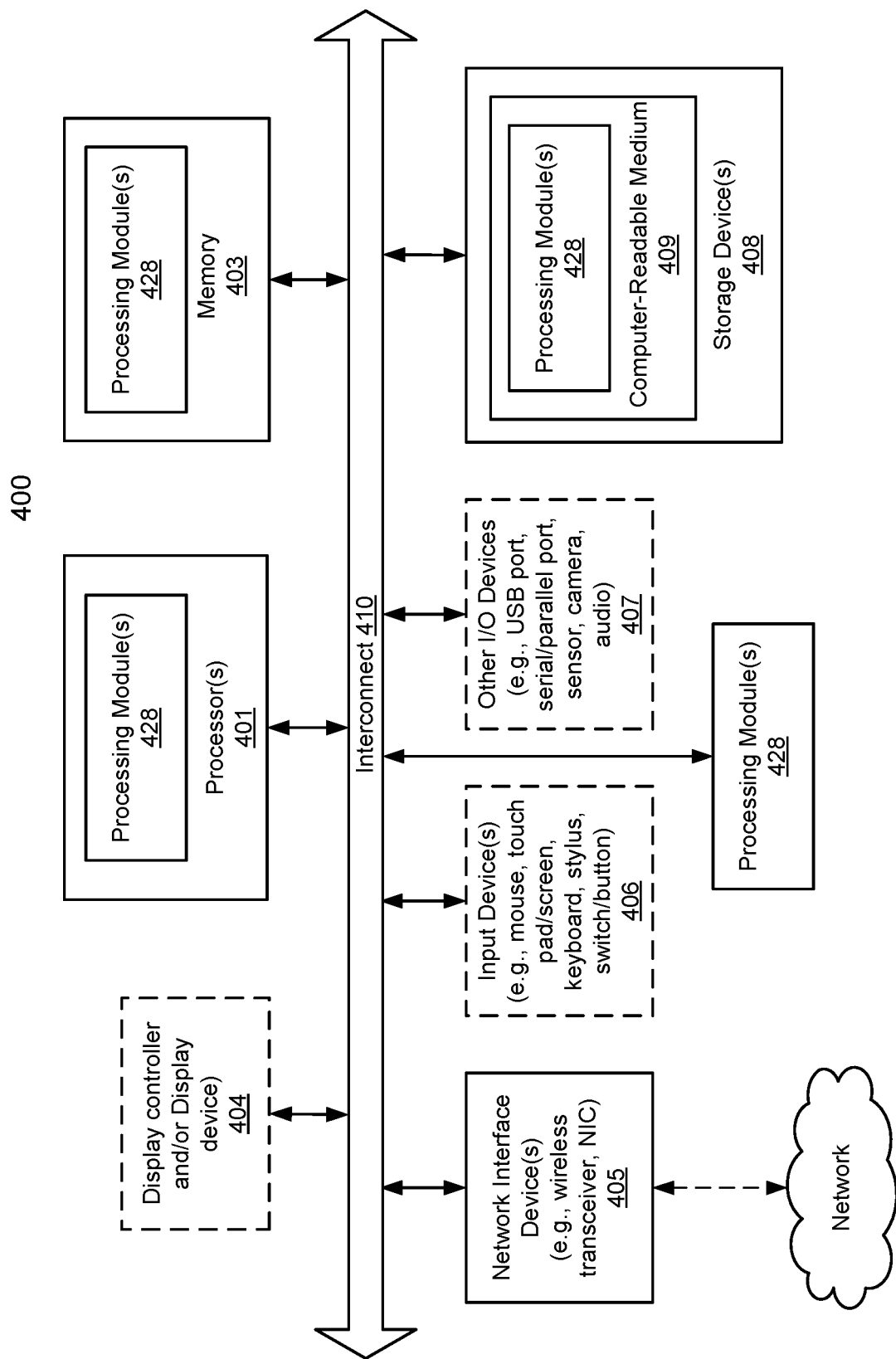

USE OF IMAGE SIGNING IN ENDPOINT DEVICE OPERATION MANAGEMENT

FIELD

Embodiments disclosed herein relate generally to security. More particularly, embodiments disclosed herein relate to securing endpoint devices using images and signatures.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIGS. 2C-2E show data flow diagrams in accordance with an embodiment.

FIG. 4 shows a block diagram illustrating a data processing system in accordance with an embodiment.

DETAILED DESCRIPTION

Figure 2A:
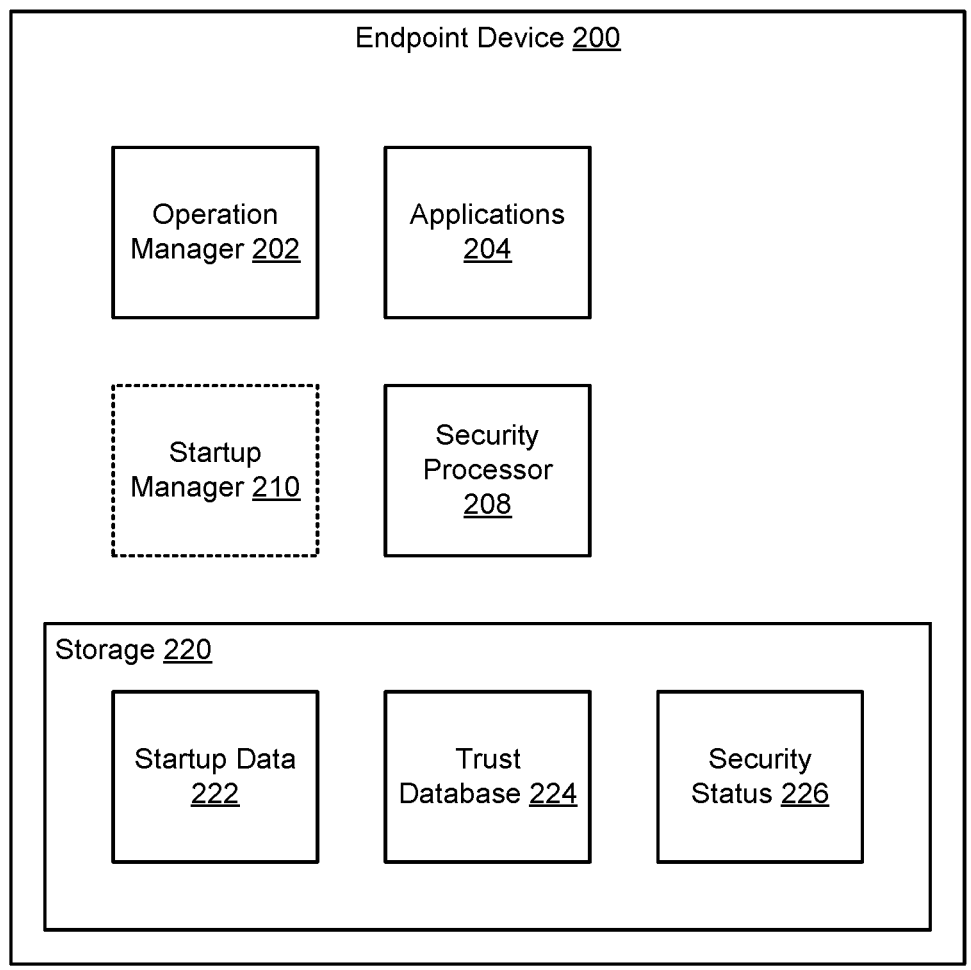
FIG. 2A shows a diagram of an endpoint device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for extending the functionality of endpoint devices while mitigating risk in extended functionality. To extend the functionality of endpoint devices, software images executable by the endpoint devices may be stored in the endpoint devices.

Prior to execution of the software images, the endpoint devices may verify trustworthiness of the software images using information stored in a trust database. The trust database may include data (e.g., hash values or other types of data structures usable to identify software images) usable to verify the software images as trustworthy.

To facilitate verification of additional software images, additional data may be added to the trust database. The additional data may be stored in attested image entries that include hash values for trusted software images, and signatures attesting to the trustworthiness of the images. Keys or other data structures usable to verify the signatures may be stored in other entries of the trust database.

Generally, the entries of the trust database may be divided into different portions. Some of the portions may be verified by security processor, while other portions may not be verified. The security processors (e.g., of the endpoint devices) may manage use of secrets such as private keys (e.g. of pubic-private key pairs).

The portions not verified by the security processors may include the attested image entries, and the portions verified by the security processors may include the entries that include keys usable to verify the signatures of the attested image entries.

Accordingly, as new software images are added to an endpoint device, new attested image entries for the new software images may be added to the trust database without impacting the ability of the security processors to verify that the trust database is trustworthy. Thus, the operation of the endpoint devices may be updated over time through use of different software images without depriving the endpoint devices of use of secrets managed by security processors.

Thus, embodiments disclosed herein may address, among other technical problems, the technical problem of security state brittleness. By not requiring that all of the contents of the trust database be verifiable for use of secrets maintained by security processors, the security state brittleness may be lessened while still allowing for software images to be verified as trustworthy prior to execution.

In an embodiment, a method for managing operation of an endpoint device is provided. The method may include, during a startup of the endpoint device: identifying a software image for execution during the startup; identifying that the software image is trustworthy for execution at least during the startup using: an attested image entry of a trust database, and another entry of the trust data, the other entry comprising a key usable to verify the attested image entry; establishing a security status of the endpoint device using a set of rules that: require establishing trustworthiness of a first portion of the trust database, and do not require establishing trustworthiness of a second portion of the trust database; obtaining use of a secret managed by a security processor using the security status; and performing an operation to contribute towards completion of the startup through the use of the secret.

The attested image entry may include a hash of the software image; and a signature that is verifiable using the key.

The first portion may include the other entry, and the second portion may include the attested image entry.

The trustworthiness of the first portion of the trust database may be established by performing a verification of content of the first portion of the trust database.

The security processor may be adapted to: prevent use of the secret while the security status is not established, and enable use of the secret while the security status is established.

Identifying that the software image is trustworthy may include attempting to verify a signature of the attested image entry using the key.

The method may also include identifying another software image for execution during the startup; identifying that the other software image is trustworthy for execution at least during the startup using: a third entry of the trust database, the third entry comprising a hash of the other software image.

The set of rules may further require establishing trustworthiness of a third portion of the trust database, the third portion of the trust database may include the third entry.

The trustworthiness of the software image and the other software image may be established prior to execution (of the software image) by the endpoint device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include one or more endpoint devices 100 operably connected to a management system 110 via communication system 120. Each of these components is discussed below.

All, or a portion, of endpoint device 102-104 may provide computer implemented services to users and/or other computing devices operably connected to endpoint devices 100. The computer implemented services may include any type and quantity of services including, for example, database services, instant messaging services, video conferencing services, etc. To provide these services, endpoint devices 100 may host applications that provide these (and/or other) computer implemented services. The applications (or other types of executing entities) may presume (and/or may require for proper operation of the applications) that a data processing system hosting the application is operating in a predetermined manner. The predetermined manner of operation may include, for example, executing an operating system, drivers, or other type of management entities that mediate, facilitate, or otherwise operate in a manner which enables the applications to operate (e.g., by providing abstracted access to hardware resources used in the execution of the applications).

To operate in the predetermined manner, endpoint devices 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off of operation of the endpoint device to an operating system or other type of operational management entity that places endpoint devices 100 into the predetermined manner of operation. The operating system may, for example, provide abstracted access to resources (e.g., processing resources provided by processors, memory resource provided by memory modules, storage resources provided by storage devices, etc.) utilized by the applications hosted by the endpoint device 100.

For example, consider a scenario where an endpoint device has been shut off. After the endpoint device is turned on, the endpoint device may be operating in a startup manner such that the endpoint device is not yet able to support execution of an application (e.g., the application may not be able to successfully execute until the endpoint device hosts an operating system). To enter the predetermine manner of operation conducive to execution of the application, the endpoint device may go through a boot process which may be performed by a type of management entity such as a basic input-output system and/or other startup management entities. The management entity may perform any number of actions (e.g., a "startup process") to prepare the endpoint device to begin execution of an operating system or other type of management entity that facilitates execution of applications (and/or operation of certain types of hardware devices such as application specific integrated circuits that may provide certain functions without need for a software layer).

These actions may include, for example, inventorying the hardware components hosted by a host device, loading drivers or other software components, configuring hardware and/or software components, etc. As part of the startup process, the management entity may also load code, configuration settings, and/or other data corresponding to an operating system (and/or other management entity types and/or other types of executing entities) to memory. The data may be stored in persistent storage thereby allowing it to be read into memory.

Once the data is loaded into memory, the endpoint device may initiate execution of code (e.g., computer instructions) included in the data in memory to begin operation of the operating system. The executing code may utilize configuration settings and/or other information also included in the data in memory.

Once the endpoint device hosts the operating system and/or performs other types of predetermined operations, discussed above, then the applications may begin to provide the computer implemented services. However, the aforementioned process, if not completed in a predetermined manner, may leave the endpoint device in a condition where it is unable to provide the computer implemented services, may provide compromised computer implemented services, and/or may otherwise operate in a manner different from expected, desired, etc.

For example, during startup various software components may be loaded. However, if any of the loaded software components are compromised (e.g., malicious), then the subsequent operation of the endpoint device may also be compromised.

To reduce the likelihood of an endpoint device entering a compromised state o operation, each endpoint device may perform code checking operations to limit the likelihood of malicious code being loaded during startup. Further, components such as trusted platform modules that may safeguard secrets (e.g., used for security) may be perform checks regarding the security posture of a host endpoint device (e.g., the security posture improving the likelihood that the code checks are completed accurately) and, if failed, may prevent use of the secrets.

While the checking code and security postures may reduce the likelihood of endpoint devices 100 entering undesired operating states (e.g., compromised states), the approach may limit the ability of the operation of the endpoint devices to be updated overtime. For example, updating the code checks that are performed by an endpoint device may be onerous. Consequently, if the code checks are not updated over time, updated versions of software may be flagged as being malicious. However, if the code checks are updated, then the security posture of the endpoint devices may be flagged as being insufficient rendering the secrets unusable by the endpoint devices.

In general, embodiments disclosed herein may provide methods, systems, and/or devices for securing endpoint devices while enabling hosted software to be updated over time. To secure the endpoint devices, the system may implement a security model where (i) code checking rules, and (ii) security posture verification rules.

The code checking rules may require presence of either (i) an image of a software entity (e.g., an application, driver, etc.) that is checked as part of establishing a security posture of an endpoint device be present, or (ii) both an attested image of the software entity that is not checked as part of establishing the security posture of the endpoint device and a key that is (a) checked as part of establishing the security posture and (b) usable to verify the attestation of the image. If either of these rules are met by an image, then the image may be treated as being trusted and allowed to execute during and/or following startup. The images, attested images, images, and keys usable to verify attestations may be stored in a data structures such as a database.

The security posture verification rules may require that keys usable to verify attested images of software entities and images of the software entities be verified but may not require that the attested images of the software entities be verified. If the images and keys can be verified, then the security posture for an endpoint device may be established. The security posture may be established by storing information regarding passed security posture verification rules in data structures such as registers.

By doing so, attested images signed with keys that are verified through the security posture verification rules may generated and used over time to establish trust in images for software entities as they are updated over time. For example, as new versions of software entities are created, attested images may be generated and deployed to endpoint device 100 to allow images of the new version of the software entities to be trusted and executed by endpoint device 100.

To provide the above noted functionality, the system of FIG. 1 may include endpoint devices 100 and management system 110. Each of these components is discussed below.

Endpoint devices 100 may provide computer implemented services that may be updated over time through use of updated version of software entities. To secure the endpoint devices, each endpoint device may use code checking rules and security posture checking rules to reduce the likelihood of malicious software entities from being hosted by endpoint devices 100. Refer to FIGS. 2A-2E for additional details regarding the operation of endpoint devices 100.

Management system 110 may facilitate use of updated software entities by endpoint devices 100. To do so, management system 110 may (i) maintain private keys corresponding to public trusted by endpoint devices 100, (ii) attest images of software using the private keys, and (iii) distribute the attested images of the software to endpoint devices 100. Refer to FIGS. 2B-2E for additional details regarding the operation of management system 110.

Figure 3:
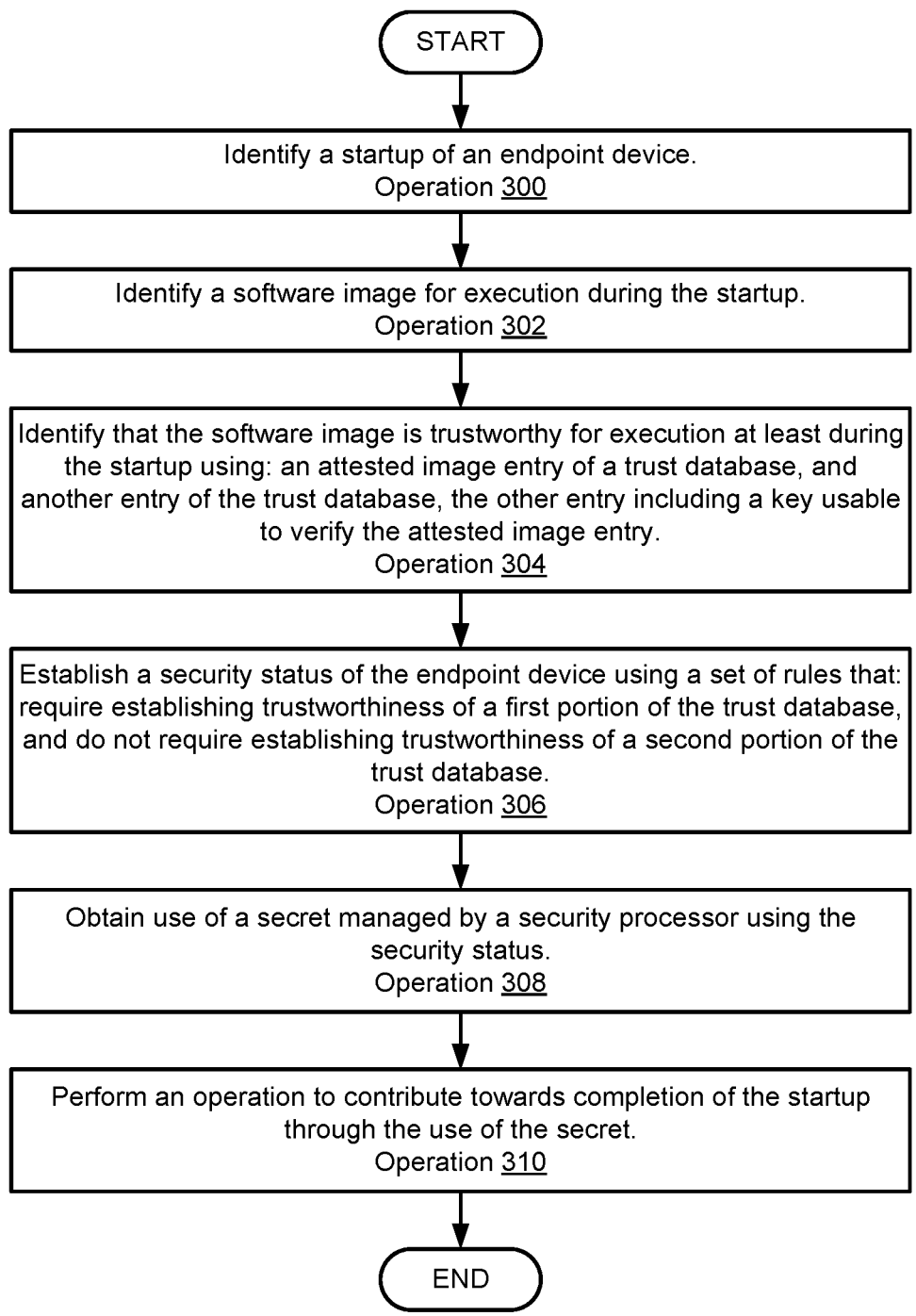
FIG. 3 shows a flow diagram illustrating a method in accordance with an embodiment.

When providing their functionality, any of (and/or components thereof) endpoint devices 100 and/or management system 110 may perform all, or a portion, of the method illustrated in FIG. 3.

Any of (and/or components thereof) endpoint devices 100 and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

Turning to FIG. 2A, a diagram of an example endpoint device 200 in accordance with an embodiment is shown. Endpoint device 200 may be similar to any of endpoint devices 100.

Endpoint device 200 may provide any number and type of computer implemented services. To provide the computer implemented services, endpoint device 200 may enter into a predetermined operating state defined by startup data 222. Startup data 222 may include any number of images of software entities. To increase the likelihood of entering the predetermined operating state rather than other operating states, endpoint device 200 may verify the trustworthiness of the images.

To provide its functionality, endpoint device 200 may include operation manager 202, applications 204, security processor 208, startup manager 210, and storage 220. Each of these components is discussed below.

Operation manager 202 may generally manage the operation of endpoint device 200. Operation manager 202 may include, for example, an operating system, drivers, and/or other types of management entities. The function of operation manager 202 may change (and the components of operation manager 202) depending on how a startup is performed.

For example, by loading different images during a startup the operation of operation manager 202 may be modified.

Applications 204 may provide the desired computer implemented services. Applications 204 may be instantiated using trusted images by loading all or a portion of the images into memory and initiating execution. As part of their operation, operation manager 202 and/or applications 204 may utilize secrets managed by security processor 208.

Generally, operation manager 202 and applications 204 may provide their functionalities while endpoint device 200 operates in the predetermined manner. For example, prior to completion of a startup, applications 204 and/or operation manager 202 may not provide their respective functionalities.

Startup manager 210 may provide startup management functionality. Startup management functionality may include initiating execution of software entities using images from startup data 222 that are found to be trustworthy, and verifying the security posture of endpoint device 200.

Figure 2B:
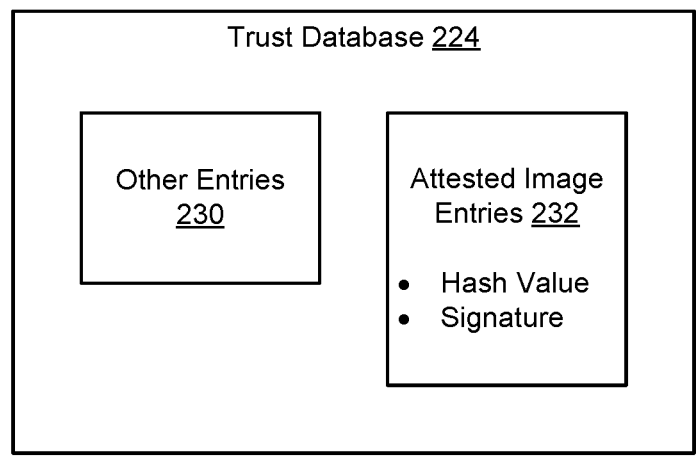
FIG. 2B shows a diagram of a trust database in accordance with an embodiment.

To determine whether any of the images are trustworthy, information from trust database 224 may be used. Code checking rules may be used with the information included in trust database 224 to ascertain whether an image is trustworthy, or whether an image has been attested by a trusted entity to be trustworthy. If found to be trustworthy, then execution of the image may be authorized. Refer to FIG. 2B for additional details regarding trust database 224.

To ascertain the security posture of endpoint device 200, some of the content of trust database 224 may be checked. The content may be checked with security posture checking rules. The security posture rules may require that the content be verifiable. If verifiable, then information indicating that the content of trust database 224 is trustworthy may be added to security status 226.

Security processor 208 may secure secrets used by endpoint device 200. To do so, security processor 208 may use the content of security status 226 to determine whether to allow the secrets to be used. For example, security processor 208 may require that at least some of the content of trust database 224 be verifiable for use of some secrets to be allowed. If authorized for use, security processor 208 may sign data structures using the secrets on behalf of applications 204, operation manager 202, and/or other entities. The secrets may include private keys maintained by security processor 208. Corresponding public keys may be distributed to other entities. Thus, signed data structures may be obtained by the other entities of endpoint device 200 without revealing the secrets. The secrets may be used to perform other types of operations while retaining secrecy of the secrets without departing from embodiments disclosed herein.

In an embodiment, one or more of operation manager 202, applications 204, security processor, and startup manager 210 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 202, applications 204, security processor, and startup manager 210. One or more of operation manager 202, applications 204, security processor, and startup manager 210 may be implemented using other types of hardware devices without departing from embodiments disclosed herein.

Security processor 208 may be implemented using a trusted platform module or other type of hardware device. Security processor 208 may store and provide selective use of stored secrets when a security posture of endpoint device 200 meets prescribed thresholds. For example, security processor 208 may directly or indirectly verify the content of portions of trust database 224 prior to allowing use of secrets that it maintains.

Security processor may verify the content of portions of trust database 224 indirectly by checking the values of certain registered included in security status 226. The content of the registers of security status 226 may be populated directly or indirectly by startup manager 210. For example, startup manager 210 and/or entities (e.g., software entities) instantiated by startup manager 210 may perform various operations that populate the registers of security status 226. The operations may include checking various configurations, contents, and other features of endpoint device 200. The results of all or a portion of these checks may be used by security processor 208 to determine the security posture of endpoint device 200. Security processor 208 may utilize a set of rules keyed to the content of security status 226 and/or other methods to identify the security posture of endpoint device 200. Once identified, security processor 208 may selectively allow use of various secrets maintained by security processor 208.

In an embodiment, one or more of operation manager 202, applications 204, security processor, and startup manager 210 is implemented using a processor adapted to execute computing code stored on a persistent storage that when executed by the processor performs the functionality of one or more of operation manager 202, applications 204, security processor, and startup manager 210 discussed throughout this application. The processor may be a hardware processor including circuitry such as, for example, a central processing unit or a microcontroller. The processor may be other types of hardware devices for processing digital information without departing from embodiments disclosed herein.

When providing their functionalities, one or more of operation manager 202, applications 204, security processor, and startup manager 210 may perform all, or a portion, of the method illustrated in FIG. 3.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Startup data 222 may include any type and quantity of data for performing any number and type of startups of endpoint device 200. Startup data 222 may include images for software entities, information indicating when different images are to be used to establish executing software entities as part of a startup, and/or other information used by startup manager 210 to place endpoint device 200 into a predetermined operating state. One in the predetermined operating state, startup manager 210 may discontinue operation (e.g., as indicated by the dashed border of startup manager 210).

Trust database 224 may include any type and quantity of information usable to verify images from startup data 222. For example, trust database 224 may be implemented using an extensible firmware interface database. Trust database 224 may include various portions that store different types of data. A first portion may store hashes of images. A second portion may store keys. A third portion may store attested hashes of images. Refer to FIG. 2B for additional details regarding trust database 224.

Security status 226 may include any type and quantity of information usable to ascertain the security posture of endpoint device 200. The content of security status 226 may be established through performance of measurements of endpoint device 200. These measurements may be performed by startup manager 210 and/or other entities. The results of the measurements may be stored in security status 226. The measurements may include (i) verifying the first portion of trust database 224 (e.g., calculating a hash and checking to see whether it matches a predetermined hash, if the hashes match then the content of the first portion of trust database 224 may be treated as being trustworthy), and (ii) verifying the second portion of trust database 224 (e.g., calculating a hash and checking to see whether it matches a predetermined hash, if the hashes match then the content of the first portion of trust database 224 may be treated as being trustworthy). The third portion of trust database 224 may not be verified and the security posture may not be based on whether the content of the third portion of trust database 224 may be established.

Any of the data structure stored in storage 220 may be implemented using lists, tables, linked lists, database unstructured data, registers, and/or other types of data structures.

While illustrated in FIG. 2A as including a limited number of specific components, a data processing system in accordance with an embodiment may include fewer, additional, and/or different components than shown herein.

Turning to FIG. 2B, a diagram of trust database 224 in accordance with an embodiment is shown. As discussed above, trust database 224 may include information usable in combination with code checking rules to ascertain whether images are trustworthy.

Trust database 224 may be implemented with any number of entries that include various types of information. A portion of the entries may be attested image entries 232. These entries may include hashes of images and signatures of attesting entities. For an image to be trusted using the content of an attested image entry, the hash of the image must match the hash included in the attested image entry, and the signature may need to be verifiable using a key from one of other entries 230.

Other entries 230 may include hashes of images or keys. For an image to be trusted using the content of other entries 230, the hash of the image must match the hash included in one of other entries 230.

Generally, the content of other entries 230 may be verified as part of establishing the security posture of an endpoint device. For example, hashes of the content of other entries 230 may be compared to predetermined hashes that when match indicate a positive security posture. In contrast, the content of attested image entries 232 may not be verified as part of establishing the security posture of the endpoint device. Accordingly, additional/new attested image entries 232 may be added over time, while the content of other entries 230 may need to remain unchanged for the security posture of the endpoint device to be established. Thus, new images for updated software entities may be added to trust database 224 as attested image entries 232 while still allowing for the security posture of the endpoint device to be established. Refer to FIG. 2C for additional details regarding establishing the security status of endpoint devices, FIG. 2D for additional details regarding using the content of trust database 224 to establish trustworthiness of images, and FIG. 2E for additional details regarding populating the content of trust database 224.

Turning to FIG. 2B, a diagram showing an example of trust database 224 in accordance with an embodiment is shown. As noted above, trust database 224 may be implemented using a data structure that includes information usable to ascertain whether to trust images of software entities. For example, trust database 224 may be implemented using a database that includes any number of entries (e.g., 230, 232). Different entries may include different content. The entries that include different types of content may be logically grouped into different portions. As noted above, different portions of trust database 224 may be validated by security processors, while other portions may not be subject to validation for the security processors to allow use of maintained secrets (e.g., private keys, other types of data structures).

For example, a first portion may include attested image entries 232. Each of attested image entries 232 may include a hash value of a software image and a signature attesting the hash value. The signatures of the attested image entries, to be trusted, may be signed using a private key for which a public key is enrolled as other entries 230. The first portion may not be measured and/or validated by security processors.

In contrast, other entries 230 may include entries that include only hash values (e.g., a second portion of entries) or keys (e.g., a third portion of entries). The first portion may be measured and/or validated by the security processors. Consequently, in contrast to the content of first portion, the content of the second and third portion of trust database 224 may not be changed without modifying the security posture of an endpoint device. Thus, the first portion may allow for new software images (e.g., updated software) to be trusted so long as keys usable to verify the attestations are available in other portions of trust database 224 that cannot be changed without modifying the security portion (e.g., thereby depriving the host endpoint device of use of secrets maintained by security processors).

Figure 2D:
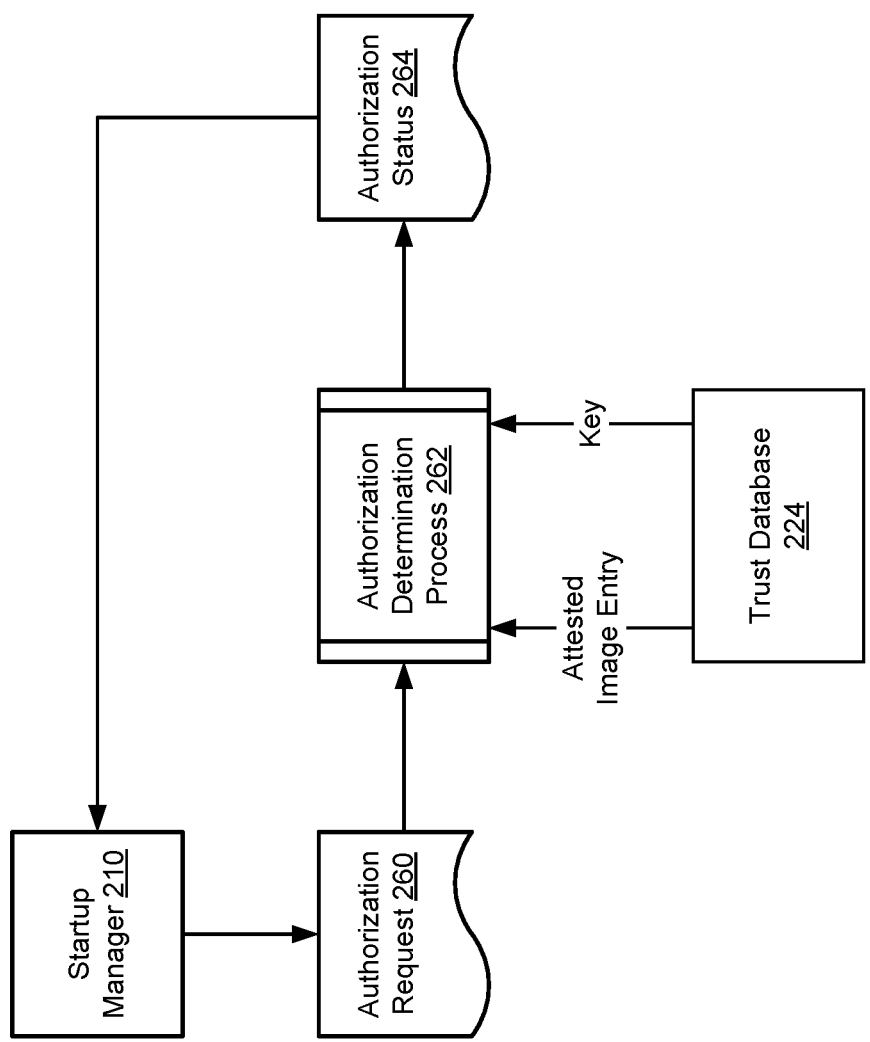
Figure 2E:
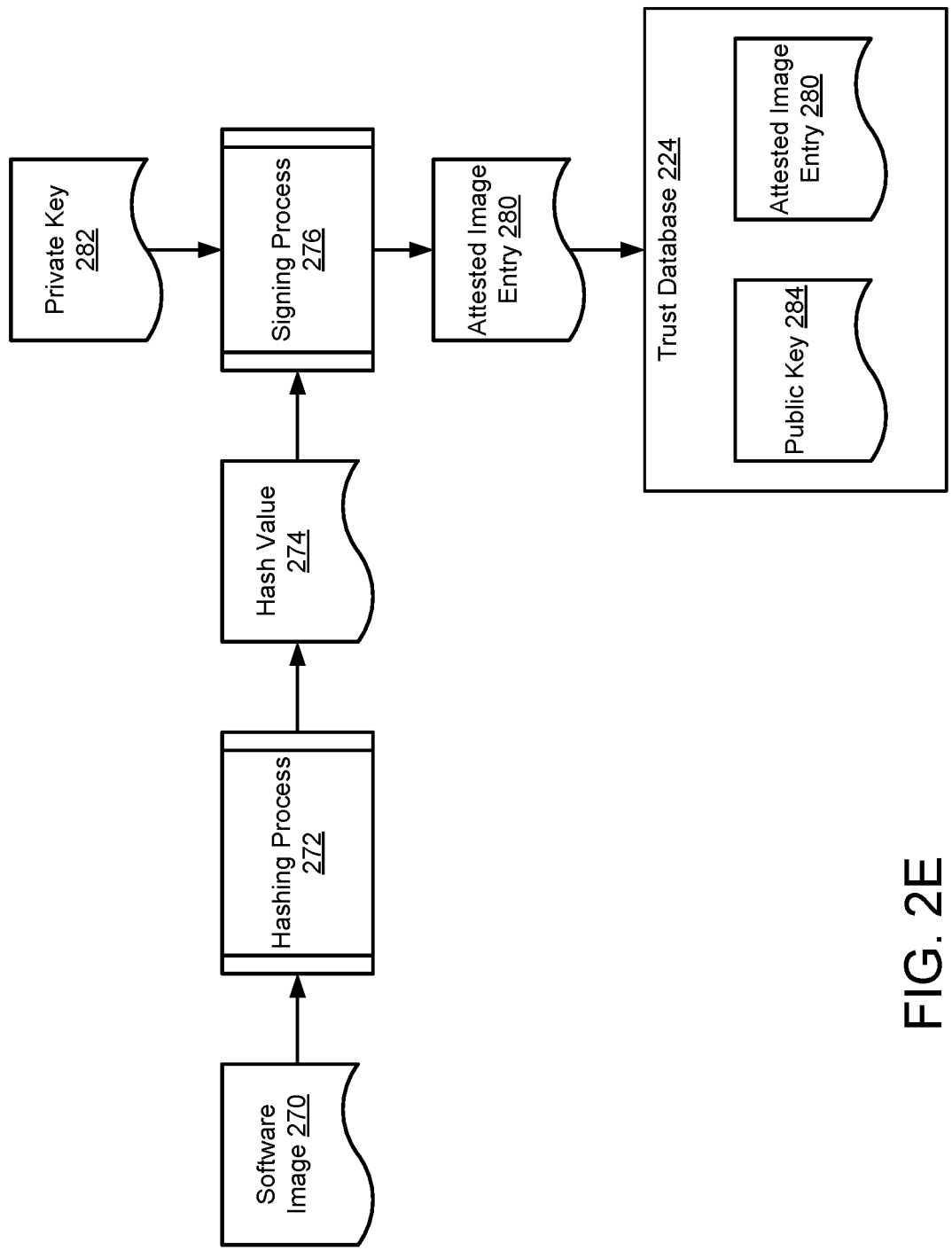

The content of trust database 224 may be updated over time and used during operation of endpoint devices. Refer to FIGS. 2C-2E for additional details regarding use of trust database 224.

Turning to FIG. 2C, a first data flow diagram in accordance with an embodiment is shown. The first data flow diagram may illustrate a process through which security status 226 is updated. The process may be performed, for example, by a startup management entity and/or software entities instantiated by the startup management entity.

To update security status 226, security status update process 250 may be performed. During security status update process 250, some portions of trust database 224 may be analyzed to ascertain whether the portions are trustworthy. The portions may be analyzed by calculating a hash value (or other type of representative value that may serve as a fingerprint) for one or more of the portions, and comparing the hash value for the one or more of the portions to verification data 252. Verification data 252 may include corresponding hash values. Verification data 252 may be stored securely and in an immutable form, or mutable form that requires significant security clearance to modify. If the hashes match, then the status of the portions of trust database may be trustworthy, otherwise the portions of trust database may be untrustworthy.

The outcome and/or status of the portions of trust database 224 may be recorded in security status 226 and/or may otherwise be used to update security status 226. Consequently, the security processor of an endpoint device may utilize security status 226 to ascertain the security posture of the endpoint device.

Turning to FIG. 2D, a second data flow diagram in accordance with an embodiment is shown. The second data flow diagram may illustrate a process for starting operation of an endpoint device.

To startup an endpoint device, startup manager 210 may be perform various actions including instantiating instances of software entities using software images. Prior to startup manager 210 instantiating the software entities, startup manager 210 may verify whether corresponding software images are trustworthy. To ascertain whether a software image is trustworthy, startup manager 210 may perform authorization determination process 262, or may send an authorization requests 260 to authorization determination process 262 (if authorization determination process 262 is implemented as a separate executing software entity).

For example, an authorization request 260 for a software image that is to be used to instantiate a software entity may be processed during authorization determination process 262. During authorization determination process 262, a hash value for the image may be obtained and compared to hash values in entries of trust database 224. If the hash value is present in an entry that is verified by the security processor, then the software image may be determined as being trustworthy. If the hash value is present in an attested image entry (e.g., that is not verified by the security processor) and the attestation can be verified using a key in another entry that is verified by the security processor, then the software image may be determined as being trustworthy. If the hash value is not present in any entries, or the attestation of the attested image entry cannot be verified, then the software image may be determined as not being trustworthy.

Authorization status 264 may reflect whether the software image is determined as being trustworthy during authorization status 264. Startup manager 210 may then elect to generate the instance (e.g., if the software image is trustworthy) or decline to generate the instance (e.g., if not trustworthy).

Turning to FIG. 2E, a third data flow diagram in accordance with an embodiment is shown. The third data flow diagram may illustrate a process for adding an attested image entry to a trust database.

To update the operation of an endpoint device, software image 270 may be stored on the endpoint device and set for execution during operation of the endpoint device. To facilitate verification of software image 270, attested image entry 280 may be added to trust database 224.

To add attested image entry 280, hashing process 272 may be performed and through which hash value 274. Hashing process 272 may generate a hash of software image 270, and hash value 274 may be the output of hashing process 272. Hash process 272 may be implemented using a hashing algorithm such as the secure hashing algorithm (SHA), with different lengths of hash values depending on a desired level of security.

While described with respect to hashing and hash values, it will be appreciated that other types of verification data may be added to attested image entry 280. The verification data may be used as a fingerprint that allows for a particular software image to be identified.

Once obtained, hash value 274 may be ingested by signing process 276. During signing process 276 a signature for hash value 274 may be generated using private key 282. The signed hash value may be attested image entry 280. The signature may serve as an attestation that the software image corresponding to hash value 274 is trusted by the entity associated with private key 282. Consequently, entities that trust the entity associated with private key 282 may use the public key (e.g., 284) corresponding to private key 282 to verify that the software image is trustworthy.

The public key (e.g., 284) corresponding to private key 282 may be stored as part of other entries in trust database 224. Thus, the public key (e.g., 284) may be subject to verification by the security processor of an endpoint device while attested image entry 280 is not subject to verification by the security processor (but may be subject to any other security procedures that the endpoint has in place for adding entries to trust database 224, such as verification by a user of the endpoint device that attested image entry 280 is to be added to trust database). Consequently, through the processes illustrated in FIG. 2E, as software is updated, new entries may be added to trust database 224 to facilitate both verification and use of the software images while retaining use of secrets maintained by security processors.

As discussed above, the components of FIG. 1 may perform various methods to manage the operation of endpoint devices. FIG. 3 illustrate a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing operation of an endpoint device in accordance with an embodiment is shown. The method may be performed by any of endpoint devices 100, management system 110, and/or other components of the system shown in FIG. 1.

Prior to operation 300, one or more pre-provisioned code modules may be obtained by a management system tasked with managing endpoint devices. The code modules may be pre-provisioned using the method illustrated in FIG. 3.

At operation 300, a startup of an endpoint device is identified. The startup may be identified automatically by application of power to the endpoint device, by restarting of the endpoint device, and/or via other methods.

At operation 302, a software image for execution during the startup is identified. The software image may be identified by reading (e.g., from storage) information regarding entities that are to be instantiated during the startup. For example, a startup manager may maintain a list or other data structure that indicates which software entities (e.g., drivers, operating systems, configuration, etc.) are to be instantiated during the startup.

At operation 304, the software image is identified as being trustworthy for executing at least during the startup using: an attested image entry of a trust database and another entry of the trust database. The other entry may include a key usable to verify the attested image entry. The software image may be identified as being trustworthy by (i) calculating a hash value (or other fingerprint) for the software image, matching the hash value to a corresponding hash value included in the attested image entry, and verifying a signature in the attested image entry using the key. The key may be a public key of a trusted entity, and the signature may serve as an attestation for the hash value.

Once identified as trustworthy, a software entity may be instantiated using the software image. The software entity may contribute to completion of the startup and/or continued operation of the endpoint device after completion of the startup.

At operation 306, a security status of the endpoint device is established using a set of rules that: require establishing trustworthiness of a first portion of the trust database, and do not require establishing trustworthiness of a second portion of the trust database. The first portion of the trust database may include an entry in which the public key is stored, and the second portion may include the attested image entry. The security status may be updated by (i) verifying the content of the first portion of the trust database and (ii) populating security status 226 based on an outcome of the verifying. The content of security status 226 may define the security state of the endpoint device, which may be used by the security processor.

At operation 308, use of a secret managed by a security processor is obtained using the security status. The use of the secret may be obtained by the security processor applying the set of rules to resolve the security state of the endpoint device. The security processor may do so automatically as part of its operation. If the set of rules are met, then the security processor may determine that the security state of the endpoint device is sufficient to allow use of the secret.

At operation 310, an operation to contribute towards completion of the startup of the endpoint device is performed through use of the secret. The operation may be any type of operation (e.g., signing a data structure using a private key maintained by security processor). The operation may be performed, for example, by requesting that the security processor use the secret in some capacity. Use of the secret by the security processor may not divulge the secret to the other components of the endpoint device.

The method may end following operation 310.

Thus, using the method illustrated in FIG. 3, software images used by an endpoint device may be updated over time and used during operation while use of secrets maintained by security processors is retained.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device, the method comprising:
    during a startup of the endpoint device:
        identifying a software image for execution during the startup;
        identifying that the software image is trustworthy for execution at least during the startup using:
            an attested image entry of a trust database, and
            another entry of the trust database, the other entry comprising a key usable to verify the attested image entry;
        establishing a security status of the endpoint device using a set of rules that:
            require establishing trustworthiness of a first portion of the trust database, and
            do not require establishing trustworthiness of a second portion of the trust database;
        obtaining use of a secret managed by a security processor using the security status; and
        performing an operation to contribute towards completion of the startup through the use of the secret.

2. The method of claim 1, wherein the attested image entry comprises:
    a hash of the software image; and
    a signature that is verifiable using the key.

3. The method of claim 2, wherein the first portion comprises the other entry, and the second portion comprises the attested image entry.

4. The method of claim 3, wherein the trustworthiness of the first portion of the trust database is established by performing a verification of content of the first portion of the trust database.

5. The method of claim 1, wherein the security processor is adapted to:
    prevent use of the secret while the security status is not established, and
    enable use of the secret while the security status is established.

6. The method of claim 1, wherein identifying that the software image is trustworthy comprises:
    attempting to verify a signature of the attested image entry using the key.

7. The method of claim 6, further comprising:
    identifying another software image for execution during the startup; and
    identifying that the other software image is trustworthy for execution at least during the startup using:
        a third entry of the trust database, the third entry comprising a hash of the other software image.

8. The method of claim 7, wherein the set of rules further require establishing trustworthiness of a third portion of the trust database, the third portion of the trust database comprising the third entry.

9. The method of claim 8, wherein the trustworthiness of the software image and the other software image must be established prior to execution by the endpoint device.

10. A non-transitory machine-readable medium having instructions stored therein, which when executed by at least one processor, cause a system to perform operations for managing operation of an endpoint device, the operations comprising:
    during a startup of the endpoint device:
        identifying a software image for execution during the startup;
        identifying that the software image is trustworthy for execution at least during the startup using:
            an attested image entry of a trust database, and
            another entry of the trust database, the other entry comprising a key usable to verify the attested image entry;
        establishing a security status of the endpoint device using a set of rules that:
            require establishing trustworthiness of a first portion of the trust database, and
            do not require establishing trustworthiness of a second portion of the trust database;
        obtaining use of a secret managed by a security processor using the security status; and
        performing an operation to contribute towards completion of the startup through the use of the secret.

11. The non-transitory machine-readable medium of claim 10, wherein the attested image entry comprises:
    a hash of the software image; and
    a signature that is verifiable using the key.

12. The non-transitory machine-readable medium of claim 11, wherein the first portion comprises the other entry, and the second portion comprises the attested image entry.

13. The non-transitory machine-readable medium of claim 12, wherein the trustworthiness of the first portion of the trust database is established by performing a verification of content of the first portion of the trust database.

14. The non-transitory machine-readable medium of claim 10, wherein the security processor is adapted to:
    prevent use of the secret while the security status is not established, and
    enable use of the secret while the security status is established.

15. The non-transitory machine-readable medium of claim 10, wherein identifying that the software image is trustworthy comprises:
    attempting to verify a signature of the attested image entry using the key.

16. The non-transitory machine-readable medium of claim 15, wherein the operations further comprise:
   identifying another software image for execution during the startup; and
   identifying that the other software image is trustworthy for execution at least during the startup using:
      a third entry of the trust database, the third entry comprising a hash of the other software image.

17. The non-transitory machine-readable medium of claim 16, wherein the set of rules further require establishing trustworthiness of a third portion of the trust database, the third portion of the trust database comprising the third entry.

18. The non-transitory machine-readable medium of claim 17, wherein the trustworthiness of the software image and the other software image must be established prior to execution by the endpoint device.

19. An endpoint device, comprising:
   a processor; and
   a memory coupled to the processor to store instructions, which when executed by the processor, cause the endpoint device to perform operations for managing operation of the endpoint device, the operations comprising:
      during a startup of the endpoint device:
         identifying a software image for execution during the startup;
         identifying that the software image is trustworthy for execution at least during the startup using:
            an attested image entry of a trust database, and
            another entry of the trust database, the other entry comprising a key usable to verify the attested image entry;
         establishing a security status of the endpoint device using a set of rules that:
            require establishing trustworthiness of a first portion of the trust database, and
            do not require establishing trustworthiness of a second portion of the trust database;
         obtaining use of a secret managed by a security processor using the security status; and
         performing an operation to contribute towards completion of the startup through the use of the secret.

20. The endpoint device of claim 19, wherein the attested image entry comprises:
   a hash of the software image; and
   a signature that is verifiable using the key.

* * * * *